United States Patent [19]

Lemaire et al.

[11] 4,223,392
[45] Sep. 16, 1980

[54] CLOCK-SIGNAL GENERATOR FOR A DATA-PROCESSING SYSTEM

[75] Inventors: Francis Lemaire; Pierre Salkazanov, both of Plaisir; Robert Bavoux, Rueil-Malmaison, all of France

[73] Assignee: Compagnie Internationale pour l'Informatique Cii-Honeywell Bull, Paris, France

[21] Appl. No.: 873,845

[22] Filed: Jan. 31, 1978

[30] Foreign Application Priority Data

Feb. 7, 1977 [FR] France .................................. 77 03316

[51] Int. Cl.² .................... G06M 3/02; H03K 3/00; G06F 1/04
[52] U.S. Cl. .................................. 364/900; 328/63; 307/269
[58] Field of Search ... 364/200 MS File, 900 MS File; 235/92 SH, 92 PE, 92 ST; 328/37, 63, 72; 307/269, 260

[56] References Cited

U.S. PATENT DOCUMENTS

| | | | |
|---|---|---|---|
| 3,418,637 | 12/1968 | Humphrey | 364/900 |
| 3,421,147 | 1/1969 | Burton et al. | 364/900 |
| 3,497,613 | 2/1970 | Botjer et al. | 364/900 |
| 3,566,090 | 2/1971 | Johnson | 235/92 SH |
| 3,691,531 | 9/1972 | Saltini et al. | 364/200 |
| 3,949,199 | 4/1976 | Odour | 235/92 SH |
| 3,971,920 | 7/1976 | Johnson | 235/92 SH |

*Primary Examiner*—Gareth D. Shaw
*Assistant Examiner*—E. Chan
*Attorney, Agent, or Firm*—Lowe, King, Price and Becker

[57] ABSTRACT

A plurality of sub-clock signals are derived from a main clock signal source by advancing a shift register and a counter with pulses from the main clock source. The shift register is selectively loaded with a desired combination of sub-clock bits in response to a predetermined number of main clock pulses being supplied to the counter. The sub-clock signals are derived from output terminals at different stages of the shift register. The state of the sub-clock signals can be selectively frozen by decoupling pulses from the main clock source to inputs of the counter and shift register.

8 Claims, 2 Drawing Figures

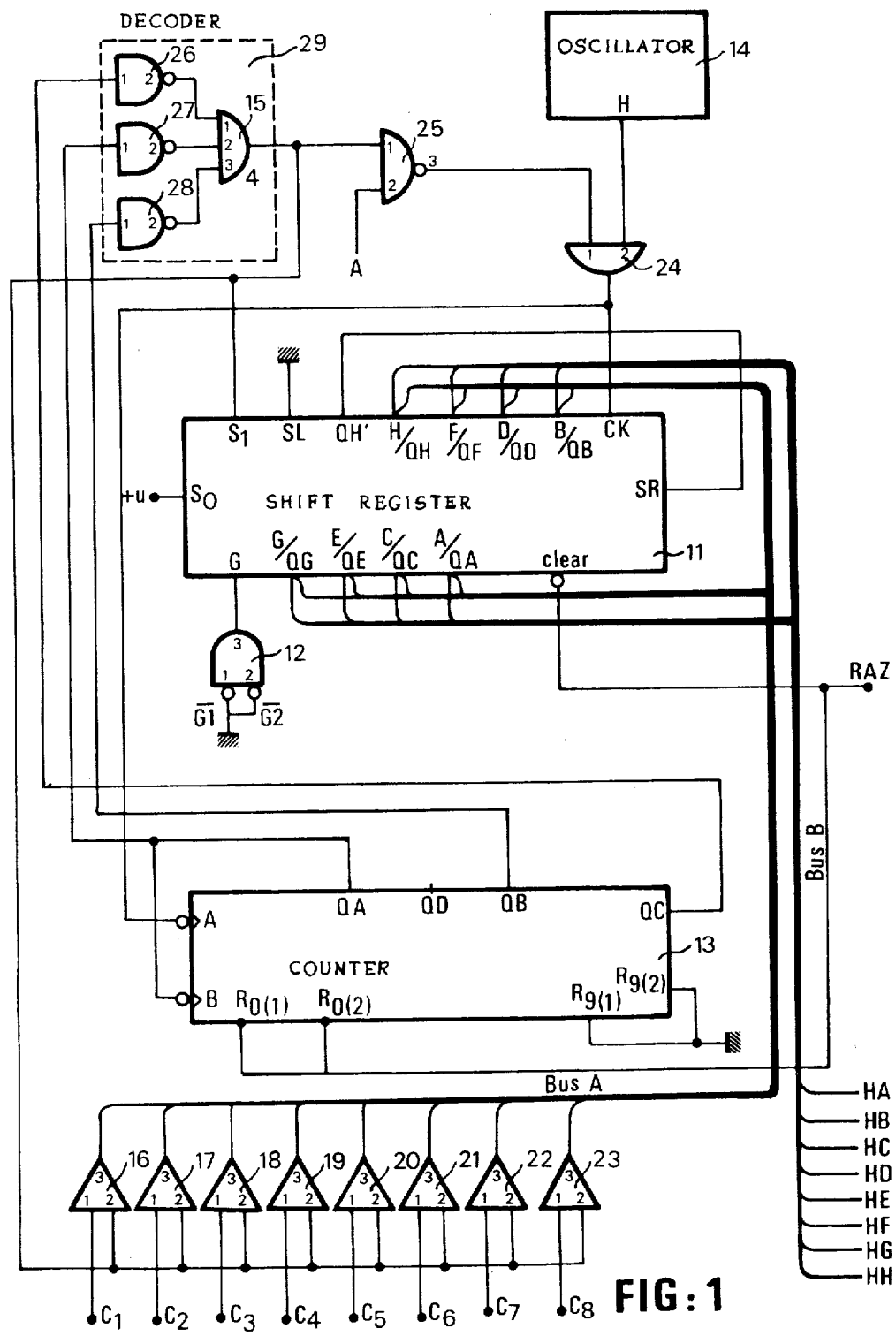
FIG:1

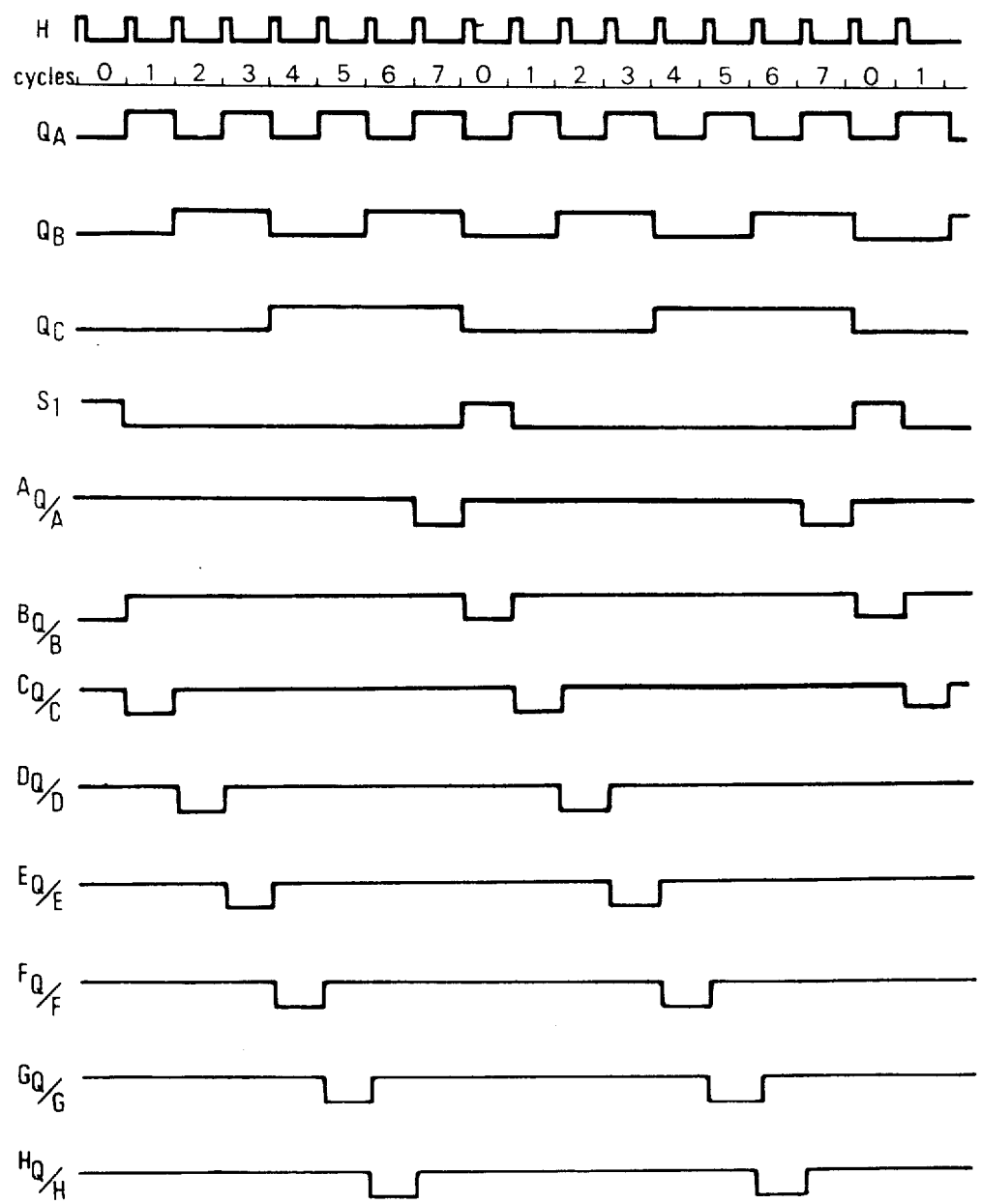
FIG:2

CLOCK-SIGNAL GENERATOR FOR A DATA-PROCESSING SYSTEM

FIELD OF THE INVENTION

The present invention relates to electronic apparatus for generating a plurality of sub-clock signals, i.e., frequency divided, derived from a main clock signal, and more particularly, to such an apparatus that includes a shift register having selectively loaded states and which is controlled by a counter.

BACKGROUND OF THE INVENTION

In the prior art, delay lines of the kind having localized or distributed time constants have been frequently used to derive sub-clock signals. This structure has a number of disadvantages however, and in particular requires the design or operating engineer to adjust the lengths of the delay lines in order to achieve the required time displacement between adjacent pulses of the sub-clock signals. Another difficulty is that the delay lines are sensitive to load variations which cause mismatches between the line and the load, in turn causing sub-clock pulse distortion. The pulse shape is restored by suitably adjusted electronic devices coupled to the end of each line. These problems necessarily increase the cost of developing electronic assemblies, and particularly data-processing systems where clock signals of a high standard are vital for synchronizing the data-processing operations.

Another structure to derive sub-clock signals uses ring-counters and a decoding matrix to extract the various sub-clock signals. This structure considerably reduces the adjustment problems of delay lines but it does not eliminate the necessity for adjusting the electronic devices coupled to the outputs of the decoding matrix. These problems arise from the use of a ring-counter having internal loops between the various flip-flops from which it is formed. The flip-flops cause widely varying load differences to appear from one sub-clock signal to another. Another drawback of a ring-counter is that the sub-clock signals cannot propagate beyond the various racks of circuit boards forming an electronic assembly; otherwise the clock signals would become unsynchronized.

In certain applications relating to data-processing systems it is desired to stop, i.e., freeze, the sub-clock signals at any time and in any state. This possibility obviously does not exist with systems which employ delay line arrangements for generating the sub-clock signals. Arrangements which employ ring-counters only allow the counters to be stopped in one particular state and not in any state whatever.

BRIEF DESCRIPTION OF THE INVENTION

The apparatus according to the invention overcomes the drawbacks of the prior art. It comprises a shift register which is controlled by pulses from a main clock-signal source which, in an application to data-processing systems, is a quartz oscillator. The apparatus also includes apparatus for setting and logging a predetermined binary combination of sub-clock signals required at a predetermined time. The combination is selectively loaded into the shift register in response to a predetermined number of main clock pulse signals being derived. To this end, a counter driven by the main clock signal derives a decoder that enables the shift register to be responsive to the predetermined combination of sub-clock signals.

It is accordingly an object of the present invention to provide a new and improved apparatus for deriving plural sub-clock signals from a main clock signal source.

Another object of the invention is to provide a source of plural sub-clock signals that can have predetermined different sequences.

A further object of the invention is to provide a sub-clock signal source wherein the state of the signals can be frozen at will.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a block diagram of an embodiment of apparatus according to the invention for generating sub-clock signals; and FIG. 2 is a time diagram showing the states of the sub-clock signals emitted by the outputs of the shift register shown in FIG. 1 as a function of the states of the counter for monitoring the progress of the bits in the shift register.

DETAILED DESCRIPTION OF THE DRAWING

The apparatus shown in FIG. 1 comprises a multiple output taps feedback shift register 11, a gate 12 for controlling the outputs of the shift register, a counter 13 which monitors the progress of the bits in the shift register 11, a quartz oscillator 14 which emits square wave signals, a decoder 29 formed by an AND gate 15 having inputs 1, 2 and 3 connected to the outputs of respective ones of three inverting amplifiers 26, 27 and 28, and a set of selectively enabled amplifiers 16 to 23 which form an arrangement for setting and logging the state of the various sub-clock signals required for a particular state of the counter 13.

In a particular embodiment of the invention, shift register 11 may be of the SN 74 S299 type, having characteristics described in the book entitled "Supplement to the TTL Data Book for Design Engineers", first edition, published by "Texas Instruments", and counter 13 may be of the SN 5490 A type having characteristics also described in the aforementioned book.

Quartz oscillator 14 emits a main clock signal from its output terminal H, connected to terminal 2 of AND gate 24, which transmits the main clock signal from its output to the CK input of the shift register 11 and to input A of the counter 13.

Each main clock signal advances shift register 11 and counter 13. The shift register 11 has a capacity of eight bits and is wired for the right-shift mode, with its output SR being connected to its input QH' so as to cause the output bit from the register to be coupled back to its input. A shift to the right is obtained when the "clear" input is at high potential, terminal $S_1$ is at zero potential, input $S_O$ is at high potential and inputs $\overline{G}_1$ and $\overline{G}_2$ of gate 12 are at low potential. The "clear" input is controlled by a zero reset signal RAZ, derived from a source (not shown) external to the apparatus of FIG. 1, e.g., a computer that is used with FIG. 1; if signal RAZ is at high potential a shift is possible, but if signal RAZ is at low potential all flip-flops included in register 11 are reset to zero. Signal RAZ is also transmitted in parallel to terminals $R_{O(1)}$ and $R_{O(2)}$ of counter 13. Terminal $S_1$ of register 11 is connected to be responsive to the output of gate 15 of decoder 29. The inputs of inverting amplifiers 26 to 28 are connected to be responsive to outputs $Q_C$, $Q_A$ and $Q_B$, respectively, of counter 13 that counts in accordance with the reflected binary code.

The output of gate 15 of decoder 29 has a binary 1 state (high potential) when all the outputs of counter 13 are in the zero state. The transition from 0 to 1 at the output of gate 15 enables shift register 11 to be loaded with an eight bit loading code that is selectively supplied to parallel inputs A/QA, B/QB, C/QC, D/QD, E/QE, F/QF, G/QG, H/QH of the register by the outputs of the three-state amplifiers 16 to 23 of the register via BUS A; a loading code indicates the state of the sub-clock signals to be derived from the apparatus. The loading code is supplied to terminals $C_1$ to $C_8$ which respectively are connected to terminals 1 of amplifiers 16 to 23. The loading code is transferred through amplifiers 16 to 23 in response to the amplifiers being enabled by a binary one at the output of gate 15 of decoder 29. Amplifiers 16 to 23 are disabled to prevent coupling of the loading code through them in response to a binary zero at the output of gate 15.

From the foregoing description, it is seen that shift register 11 can be loaded with any binary code when all of the outputs QA, QB, QC of counter 13 are in the zero state. To load register 11 in any one of the eight states of counter 13, the connections between decoder 29 and the outputs of the counter 13 are appropriately arranged. It is also possible to produce a decoder 29 which enables the register 11 to be loaded a plurality of times during the eight cycles of the counter.

For decoder 29 of FIG. 1, when the QA, QB, and QC outputs of counter 13 are not binary zeros, the output of decoder 29 and the input $S_1$ of register 11 are binary zeros to allow a right shift of all the bits which were loaded in register 11 during the previous cycle. To derive the output sub-clock signals, the states of all the flip-flops in the shift register 11 are selectively transmitted from terminals A/QA, B/QB, CQC, D/QD, E/QE, F/QF, G/QG, and H/QH by BUS B to output terminals HA, HB, HC, HD, HE, HF, HG, HH whenever no loading of the parallel inputs of the shift register is possible, i.e., whenever the input to terminal $S_1$ of register 11 is not having a zero to one transition.

A NAND gate 25, responsive to the output of AND gate 15, enables all the sub-clock signals to be frozen in whatever state is programmed at inputs $C_1$ to $C_8$ of the apparatus. NAND gate 25 is controlled by a signal A that orders the clock signals to be frozen. When signal A and the output of AND gate 15 are both at the 1 level, NAND gate 25 derives a binary zero output which is supplied to input 1 of AND gate 24 to disable gate 24 so it has a zero output state that prevents output signal H of oscillator 14 from being transmitted to inputs CK and A of the shift register 11 and the counter 13 respectively. The sub-clock signals are thus frozen in the state of the combination supplied to inputs $C_1$ to $C_8$.

In this arrangement, freeze signal A for the clock signals may assume the logic 1 level at any moment, except during that half of the first state of counter 13 when signal H is also at the 1 level. The fact that signal A can change in all the other states of counter 13 makes the arrangement extremely useful since it virtually removes the troublesome restriction on the times at which the clock signals can be frozen. The arrangement which has just been described enables the sub-clock signals to be frozen in virtually any state whatever.

In another embodiment, signal A for freezing the clock signal may be supplied directly to input 1 of AND gate 24, without being combined with the output of decoder 29 in NAND gate 25. In such an instance, signal A enables gate 24 directly so that clock signal H is continuously supplied to the clock input CK of the shift register 11 and to input A of the counter 13. Thereby, a logic 1 level is supplied to input CK of the shift register whenever, in a normal cycle, a sub-clock signal derived from the register is at the 0 level. The advantage of this is that all the sub-clock signals can be stopped in the 1 state, a state in which they do not normally pass. This embodiment has a disadvantage, in comparison with the previous embodiment, because the clock signal can only be stopped in the 11111111 state.

FIG. 2 is a timing diagram showing the various states assumed by the shift register 11 and the counter 13 when the particular code applied to inputs $C_1$ to $C_8$ is 10111111. Output signal H from oscillator 14 is represented by the line at the top and directly below it appear the cycle members for this signal. On lines QA, QB and QC are shown the forms of the output signals from counter 13. On line $S_1$ is shown the signal supplied by decoder 29 at input $S_1$ of shift register 11; signal $S_1$ has a high level when signals QA, QB and QC are simultaneously at the low level. A high level of signal $S_1$ appears every eight cycles to represent the time origin when the shift register is loaded with the combination 10111111. Lines, AQ/A, BQ/B, CQ/C, DQ/D, EQ/E, FQ/F, GQ/G, HQ/H represent the cub-clock signal wave forms at the outputs of shift register 11. The following table summarizes the state of the outputs of register 11 as a function of the cycle of signal H.

|         | AQ/A | BQ/B | CQ/C | DQ/D | EQ/E | FQ/F | GQ/G | HQ/H |
|---------|------|------|------|------|------|------|------|------|
| Cycle 0 | 1    | 0    | 1    | 1    | 1    | 1    | 1    | 1    |
| Cycle 1 | 1    | 1    | 0    | 1    | 1    | 1    | 1    | 1    |
| Cycle 2 | 1    | 1    | 1    | 0    | 1    | 1    | 1    | 1    |
| Cycle 3 | 1    | 1    | 1    | 1    | 0    | 1    | 1    | 1    |
| Cycle 4 | 1    | 1    | 1    | 1    | 1    | 0    | 1    | 1    |
| Cycle 5 | 1    | 1    | 1    | 1    | 1    | 1    | 0    | 1    |
| Cycle 6 | 1    | 1    | 1    | 1    | 1    | 1    | 1    | 0    |
| Cycle 7 | 0    | 1    | 1    | 1    | 1    | 1    | 1    | 1    |

While there have been described and illustrated several specific embodiments of the invention, it will be clear that variations in the details of the embodiments specifically illustrated and described may be made without departing from the true spirit and scope of the invention as defined in the appended claims.

What is claimed is:

1. An apparatus for enabling a plurality of like-frequency sub-clock signals having differing phases to be generated from a main clock signal generator comprising:

a first setting and logging means for indicating a state of the sub-clock signals in the form of multibit information;

a second means having:

a multiple taps memory means for storing the state of the sub-clock signals as logged by the said first means, means for shifting the state of the sub-clock signals stored in said memory means, and output means responsive to signals at the multiple taps of the memory means for deriving the sub-clock signals;

a third means for controlling the shifting of the sub-clock signal state contained in the said second means by one bit for each cycle of the main clock signal; and a fourth means controlled by the main clock signal generator for counting the number of shifts of the sub-clock states in said second means, and means responsive to a predetermined count of the number of shifts for controlling the loading into the second means the state of the sub-clock signals indicated by the first means.

2. The apparatus of claim 1 further comprising fifth means for enabling the sub-clock signals to be frozen in any state defined by said first means.

3. The apparatus of claim 2 wherein said first means comprises a series of amplifiers, each of which logs one bit of binary information representing the state of the sub-clock signals.

4. The apparatus of claim 1 wherein said second means comprises a feedback shift register, a decoder connected to the shift register for controlling the ability of the shift register to shift and for selecting the cycle of the main clock signal during which a sub-clock signal state set by the first means is loaded into the shift register and for enabling main clock signal cycles during which shifts are to take place in the shift register.

5. The apparatus of claim 1 wherein said fourth means comprises a counter responsive to the main clock signal and which counts in synchronization with the main clock signal, said counter having outputs connected to the inputs of a decoder included in said third means.

6. Apparatus for enabling a plurality of like-frequency sub-clock signals having differing phases to be generated from a main clock signal, comprising a shift register having a predetermined number of cascaded stages responsive to the main clock signal so signals are shifted between the stages in synchronization with the main clock signal, the sub-clock signals being derived from outputs of the shift register stages, means for enabling a coded signal for the different sub-clock signals to be selectively loaded into the shift register stages, and a counter responsive to the main clock signal so the counter is advanced in synchronism with the main clock signal, and a decoder responsive to a predetermined count of the counter for controlling the loading of the coded signal into said shift register.

7. The apparatus of claim 6 further including a gate responsive to an external signal source for controlling freezing of the shift register at the sub-clock signal combination which has been loaded into the shift register by the decoder.

8. The apparatus of claim 7 wherein the gate is responsive to the simultaneous derivation of signals from the external signal source and decoder for freezing the shift register.

* * * * *